Dec. 26, 1939.     C. A. BICKEL     2,184,377
TAPER FORMING MACHINE
Filed July 26, 1937     15 Sheets-Sheet 1
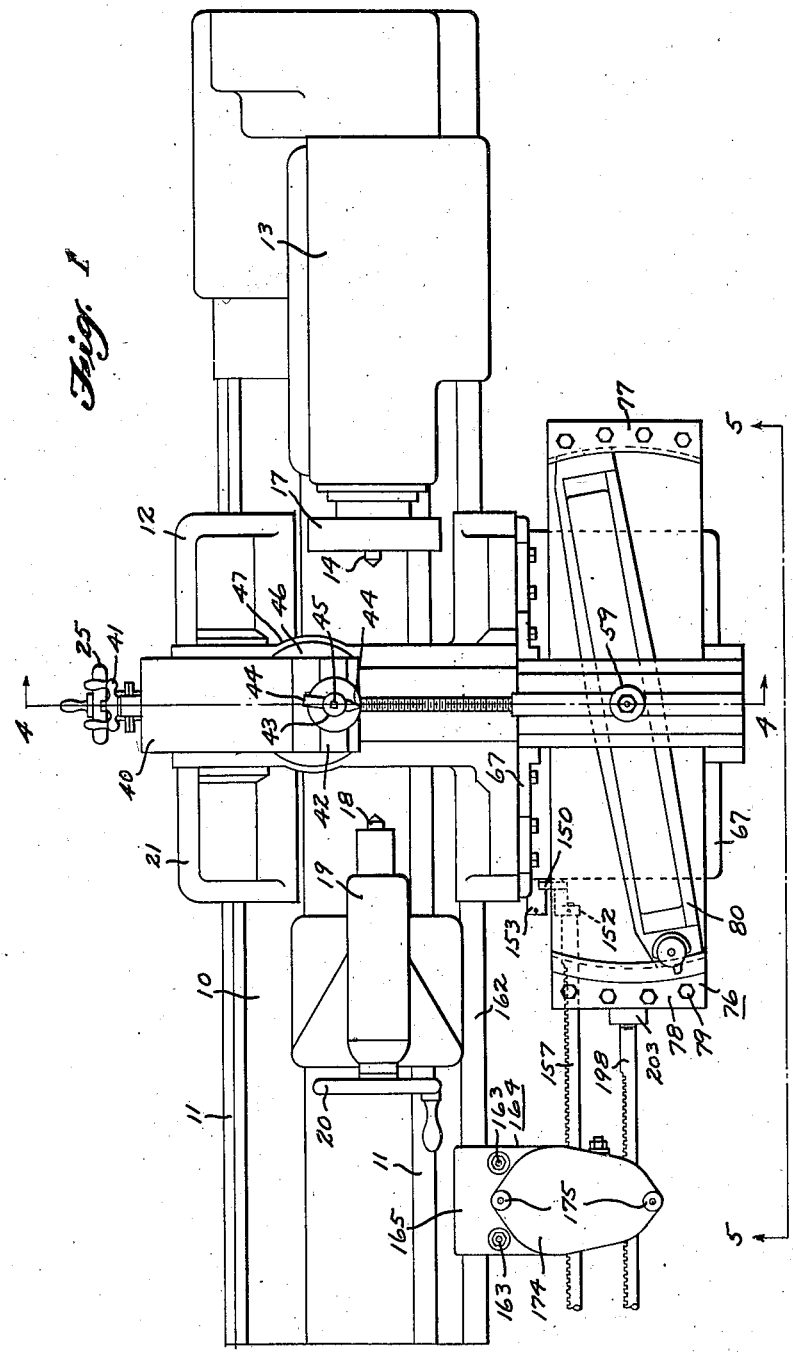
INVENTOR.
CLIFFORD A. BICKEL
BY Toulmin & Toulmin
ATTORNEY.

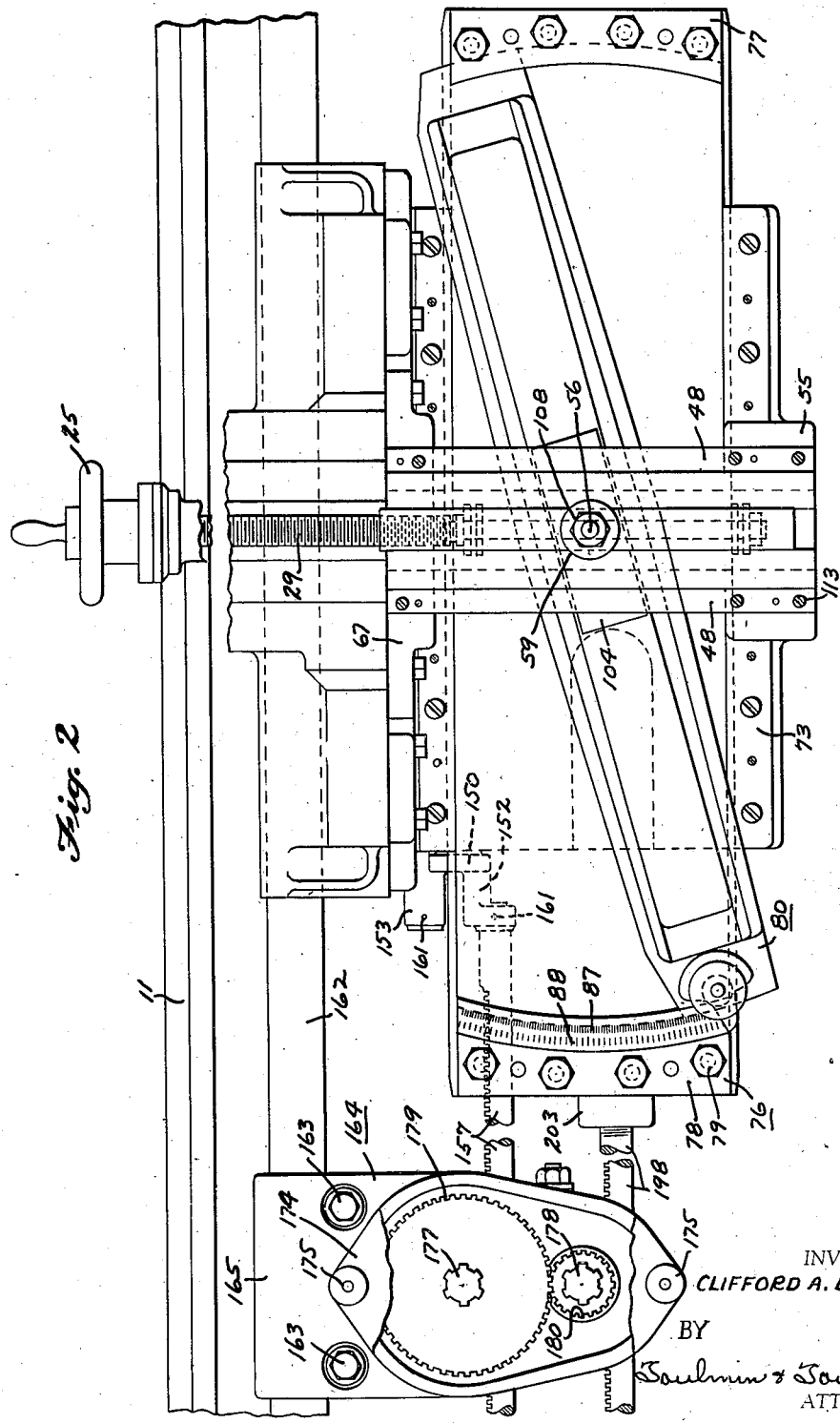

Dec. 26, 1939.　　　　C. A. BICKEL　　　　2,184,377
TAPER FORMING MACHINE
Filed July 26, 1937　　　　15 Sheets-Sheet 3
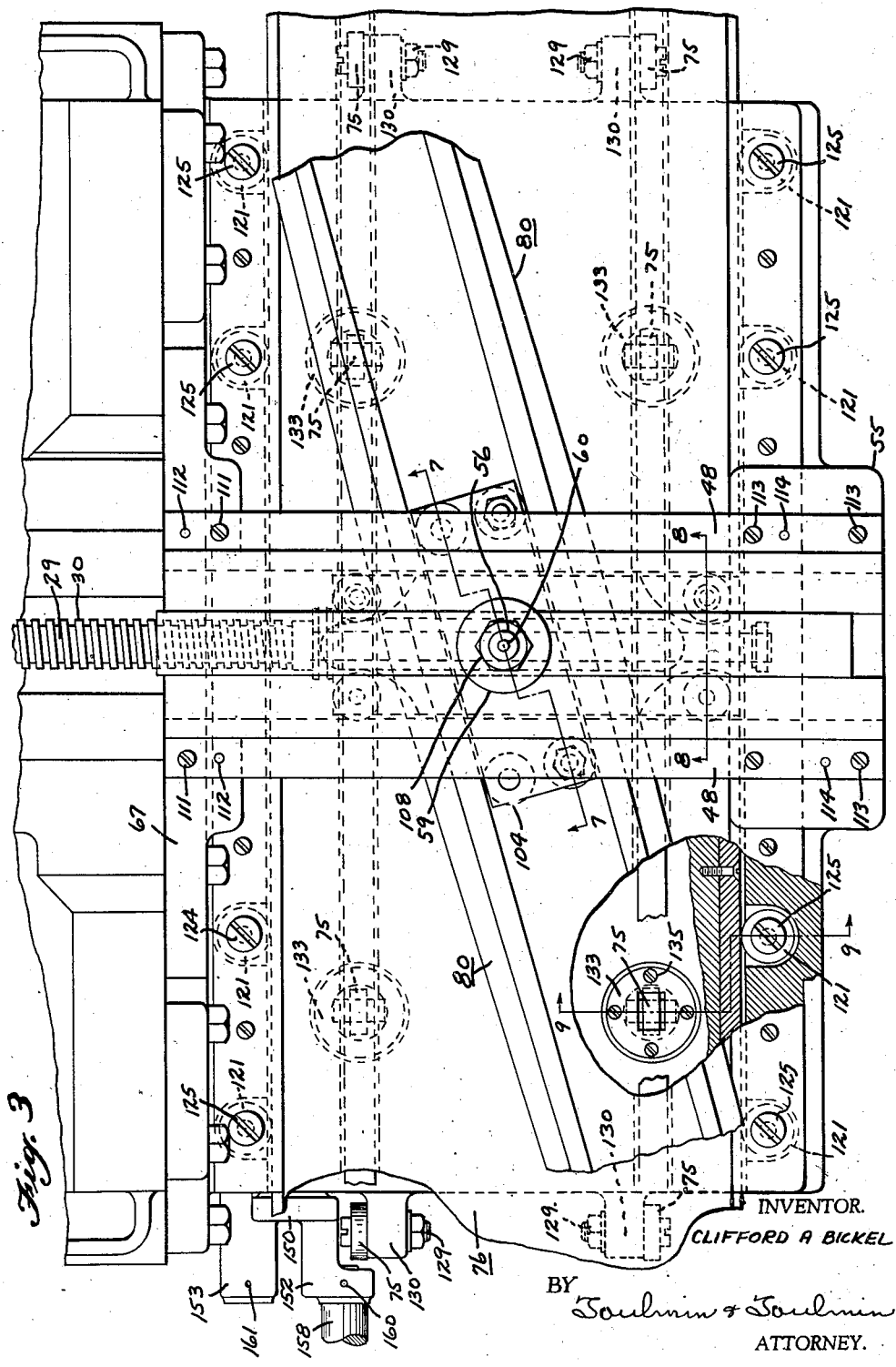
INVENTOR.
CLIFFORD A. BICKEL
BY Toulmin & Toulmin
ATTORNEY.

Dec. 26, 1939.   C. A. BICKEL   2,184,377
TAPER FORMING MACHINE
Filed July 26, 1937   15 Sheets-Sheet 4
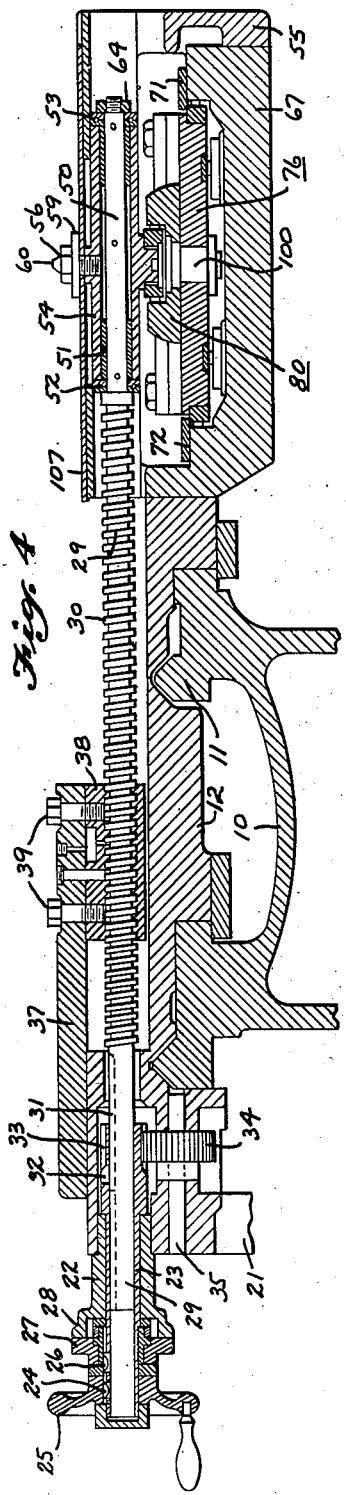
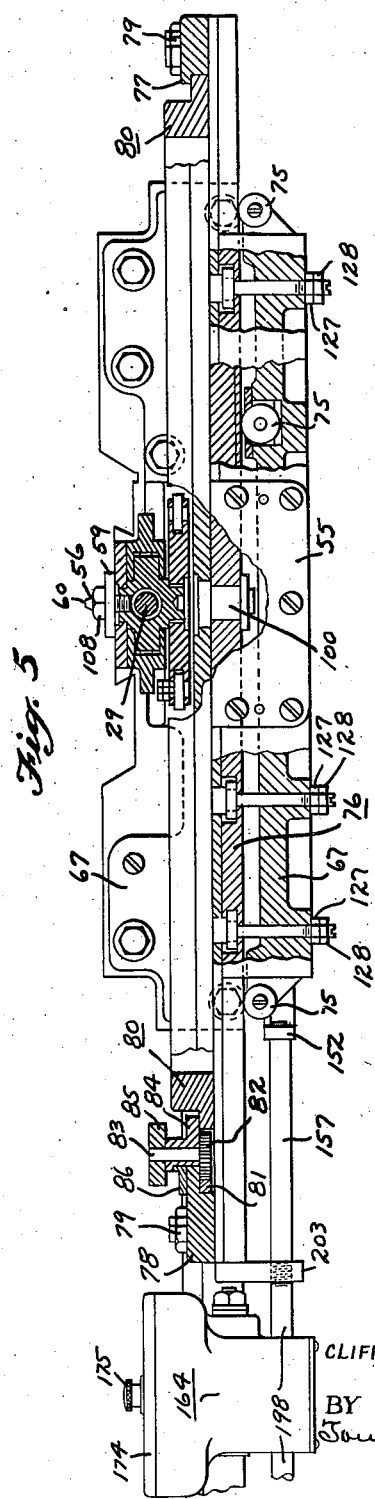
INVENTOR.
CLIFFORD A. BICKEL
BY
Toulmin & Toulmin
ATTORNEY.

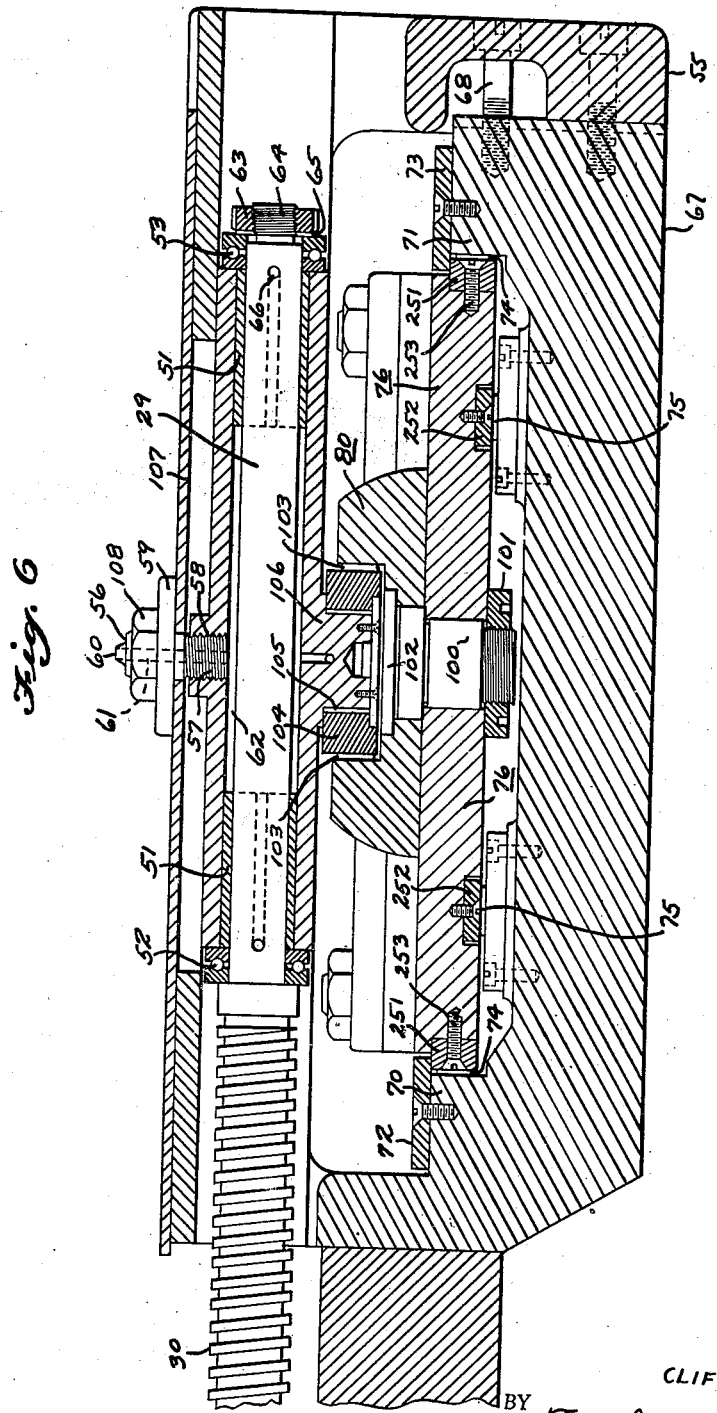

Dec. 26, 1939.  C. A. BICKEL  2,184,377
TAPER FORMING MACHINE
Filed July 26, 1937  15 Sheets-Sheet 6
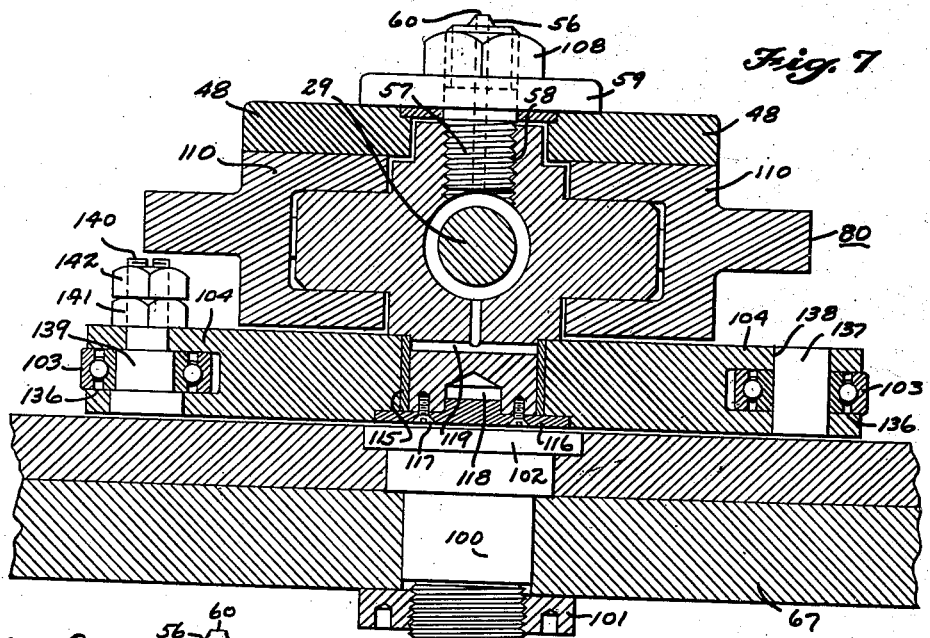
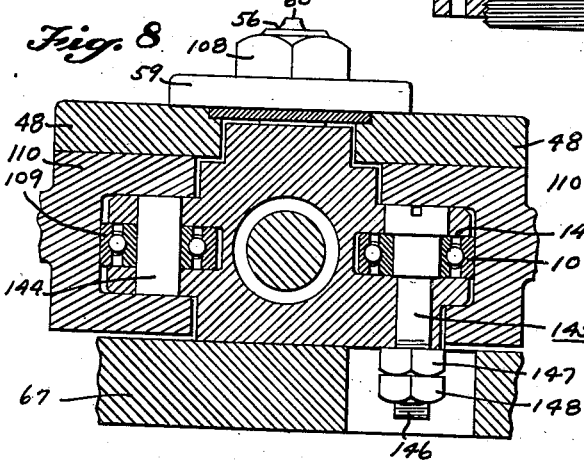
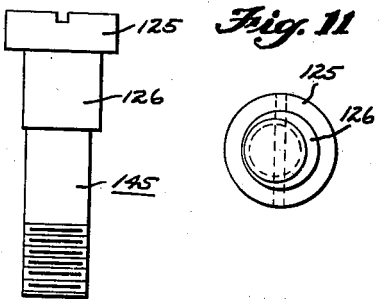
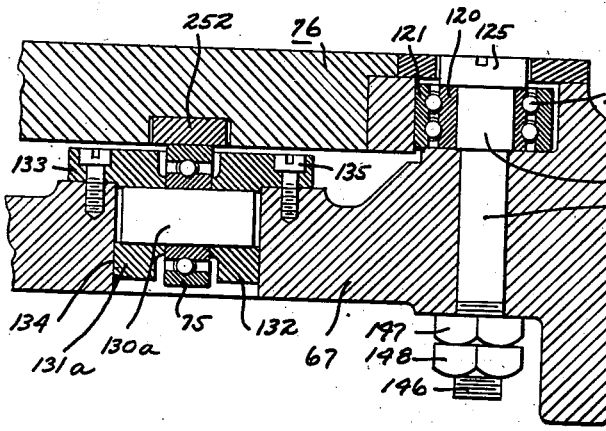
INVENTOR.
CLIFFORD A. BICKEL
BY Toulmin & Toulmin
ATTORNEY.

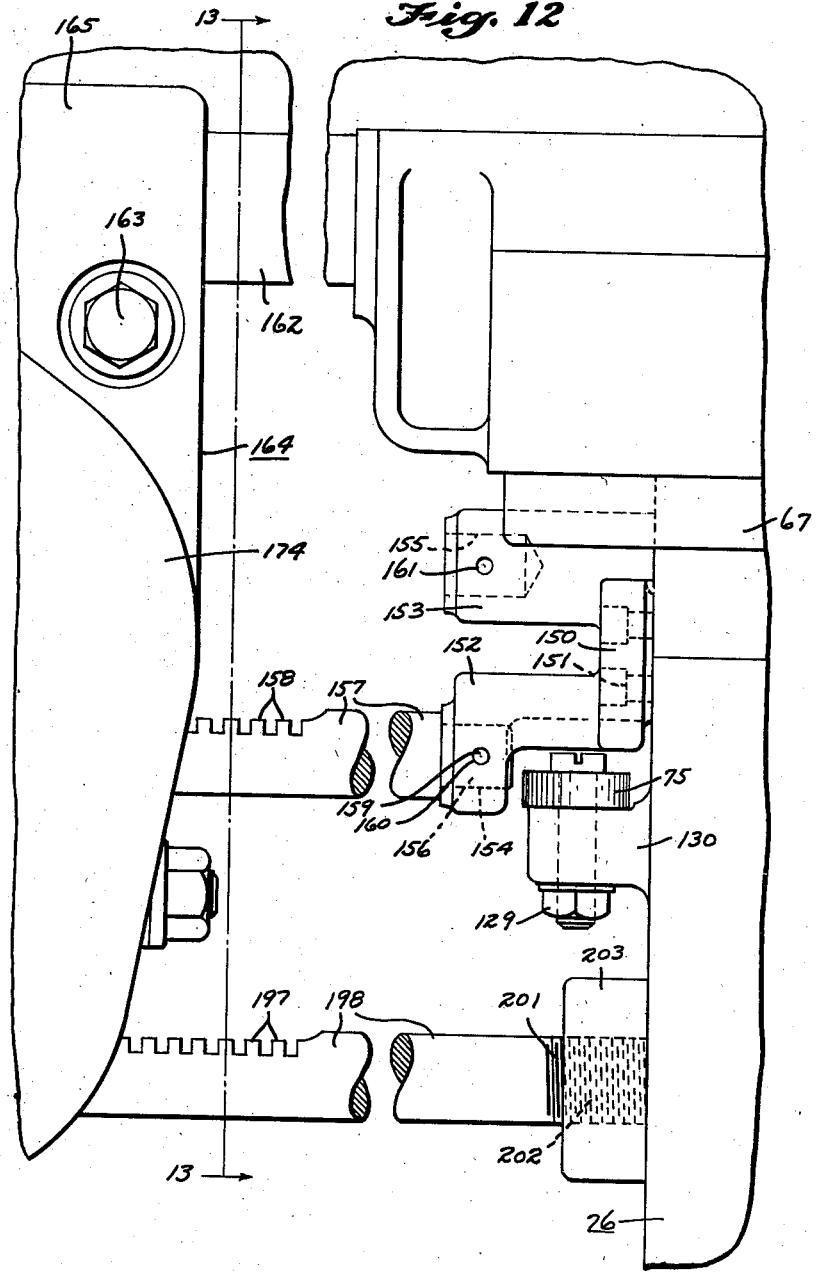

Dec. 26, 1939.　　　　C. A. BICKEL　　　　2,184,377
TAPER FORMING MACHINE
Filed July 26, 1937　　　15 Sheets-Sheet 8
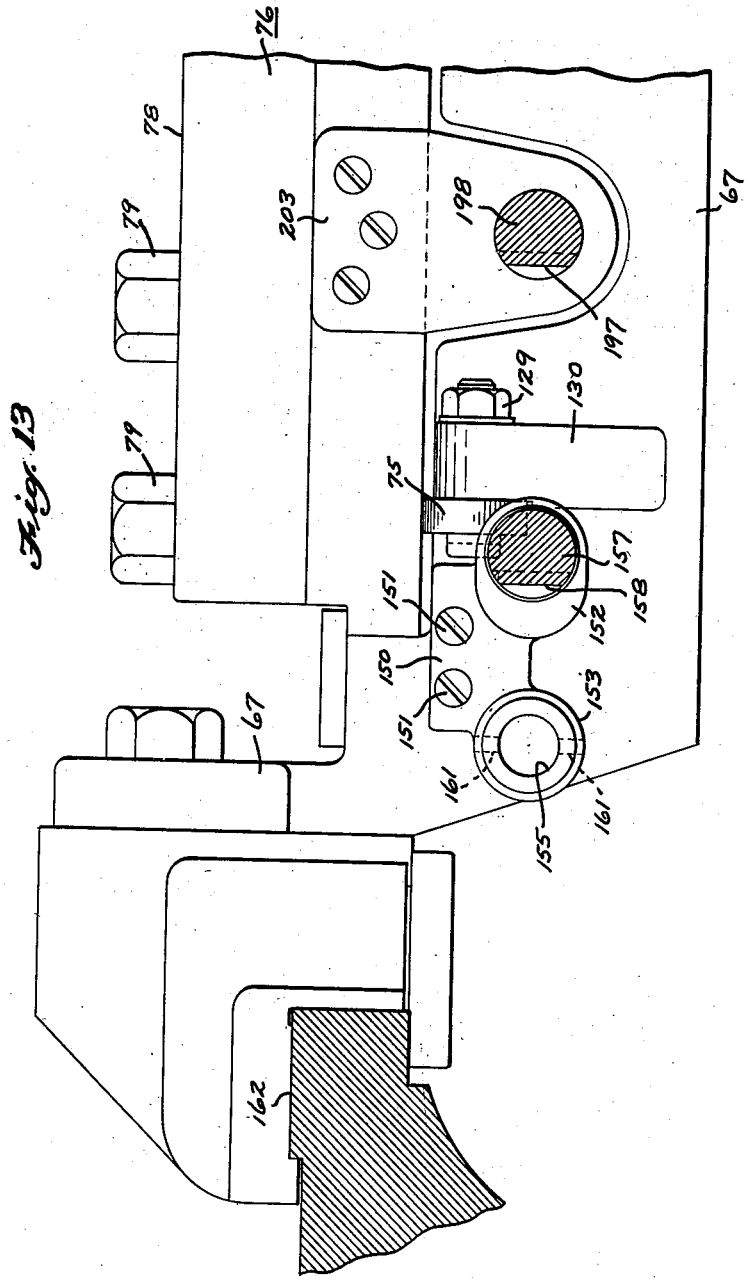
INVENTOR.
CLIFFORD A. BICKEL
BY
Toulmin & Toulmin
ATTORNEY.

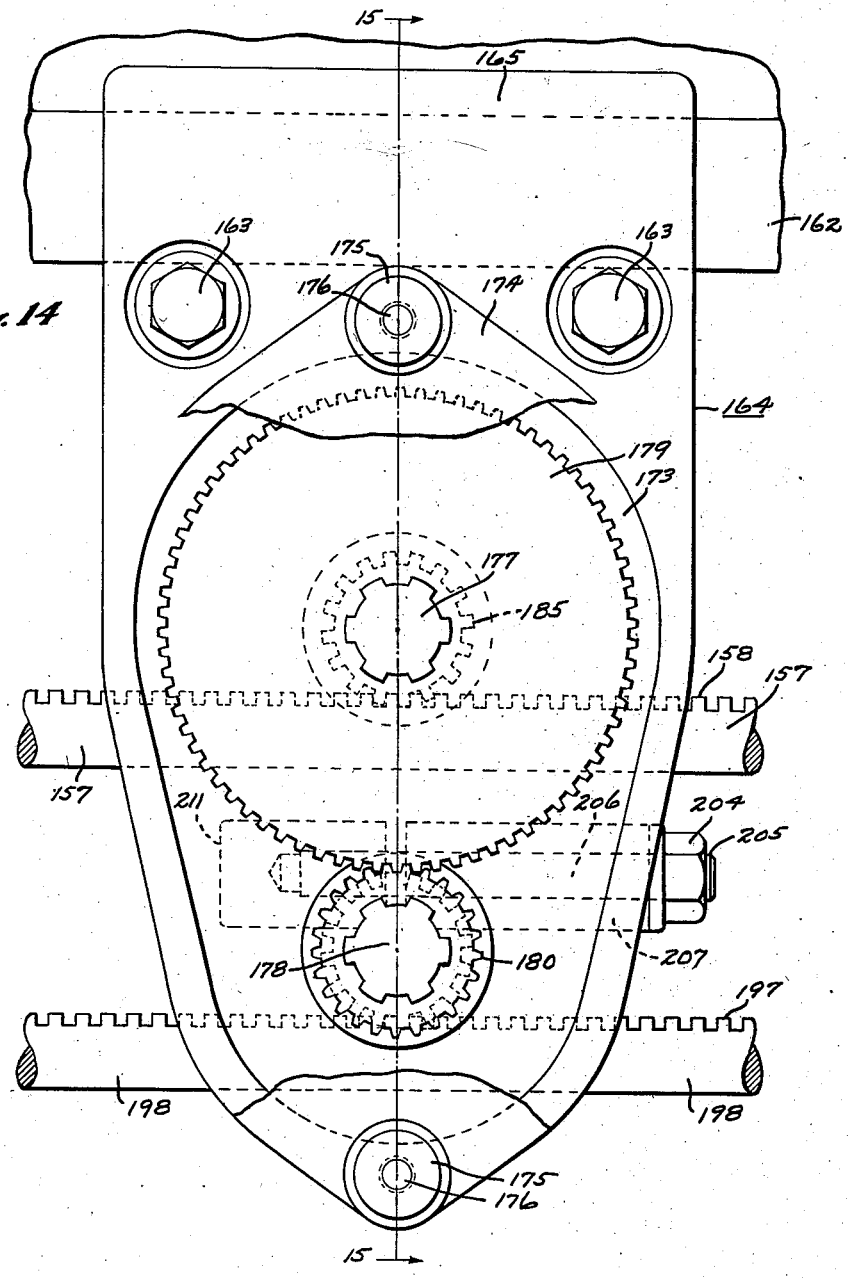

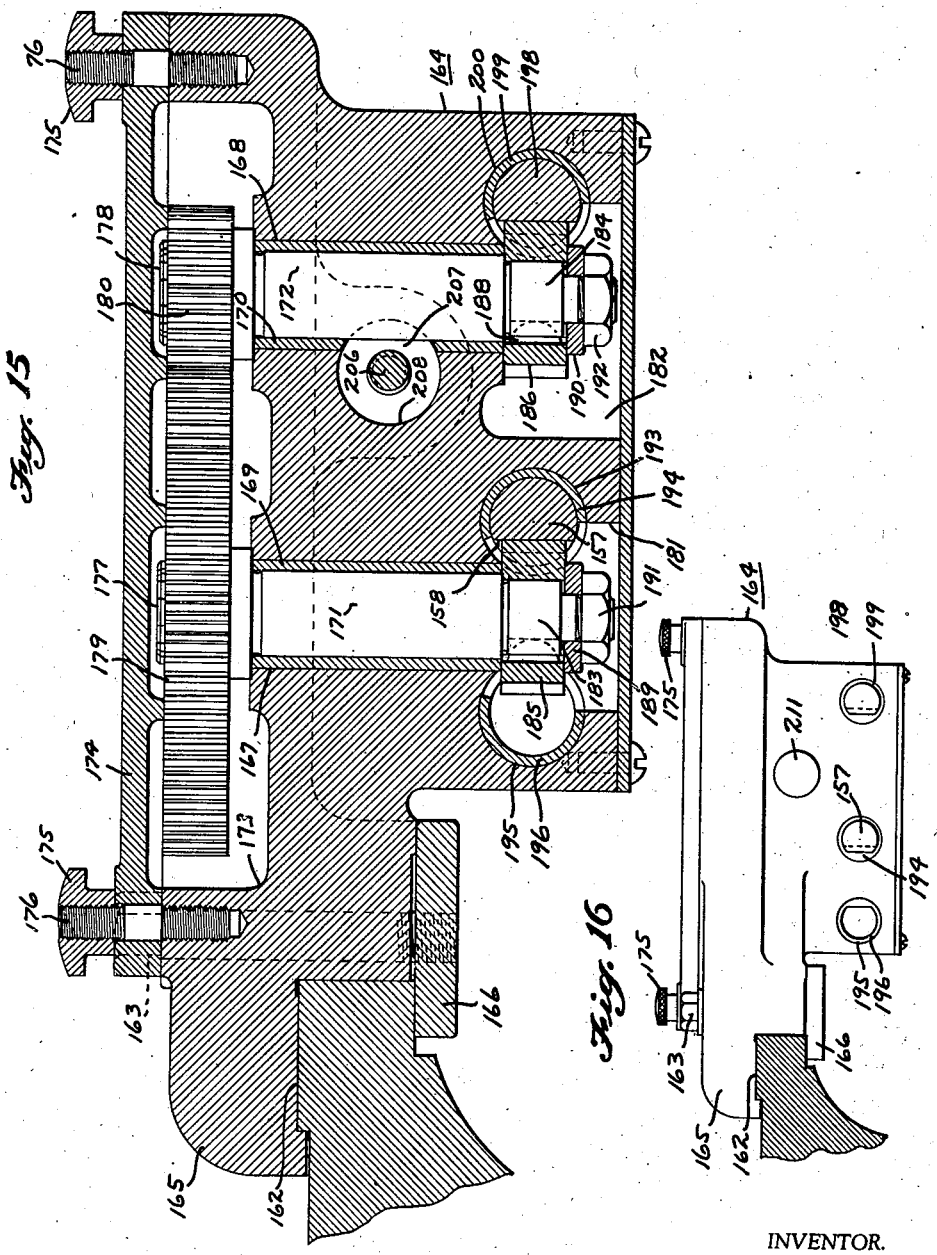

Dec. 26, 1939.　　　　C. A. BICKEL　　　　2,184,377
TAPER FORMING MACHINE
Filed July 26, 1937　　　15 Sheets-Sheet 11

INVENTOR.
CLIFFORD A. BICKEL
BY Toulmin & Toulmin
ATTORNEY.

Dec. 26, 1939.  C. A. BICKEL  2,184,377
TAPER FORMING MACHINE
Filed July 26, 1937  15 Sheets—Sheet 12
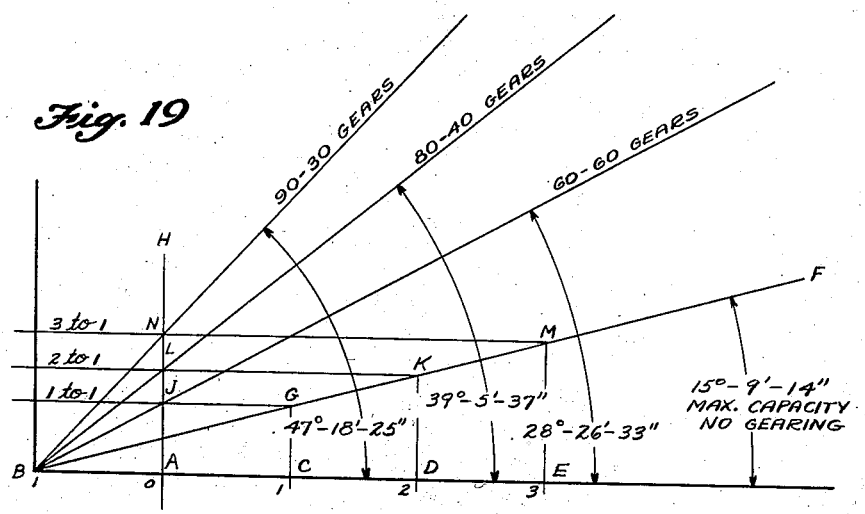
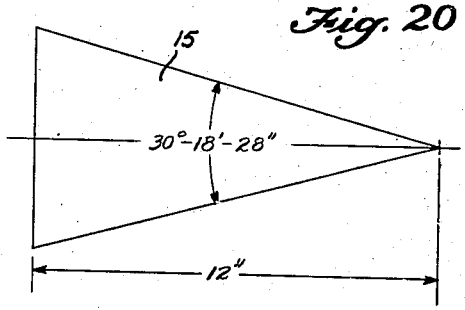
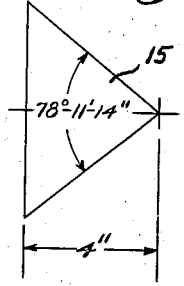
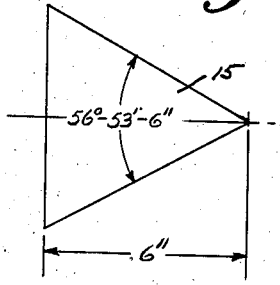
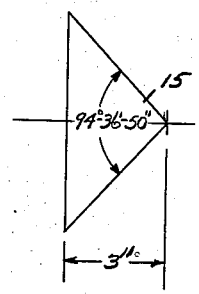
INVENTOR.
CLIFFORD A. BICKEL
BY
Toulmin & Toulmin
ATTORNEY.

Dec. 26, 1939.                C. A. BICKEL                2,184,377
                          TAPER FORMING MACHINE
                    Filed July 26, 1937      15 Sheets-Sheet 13
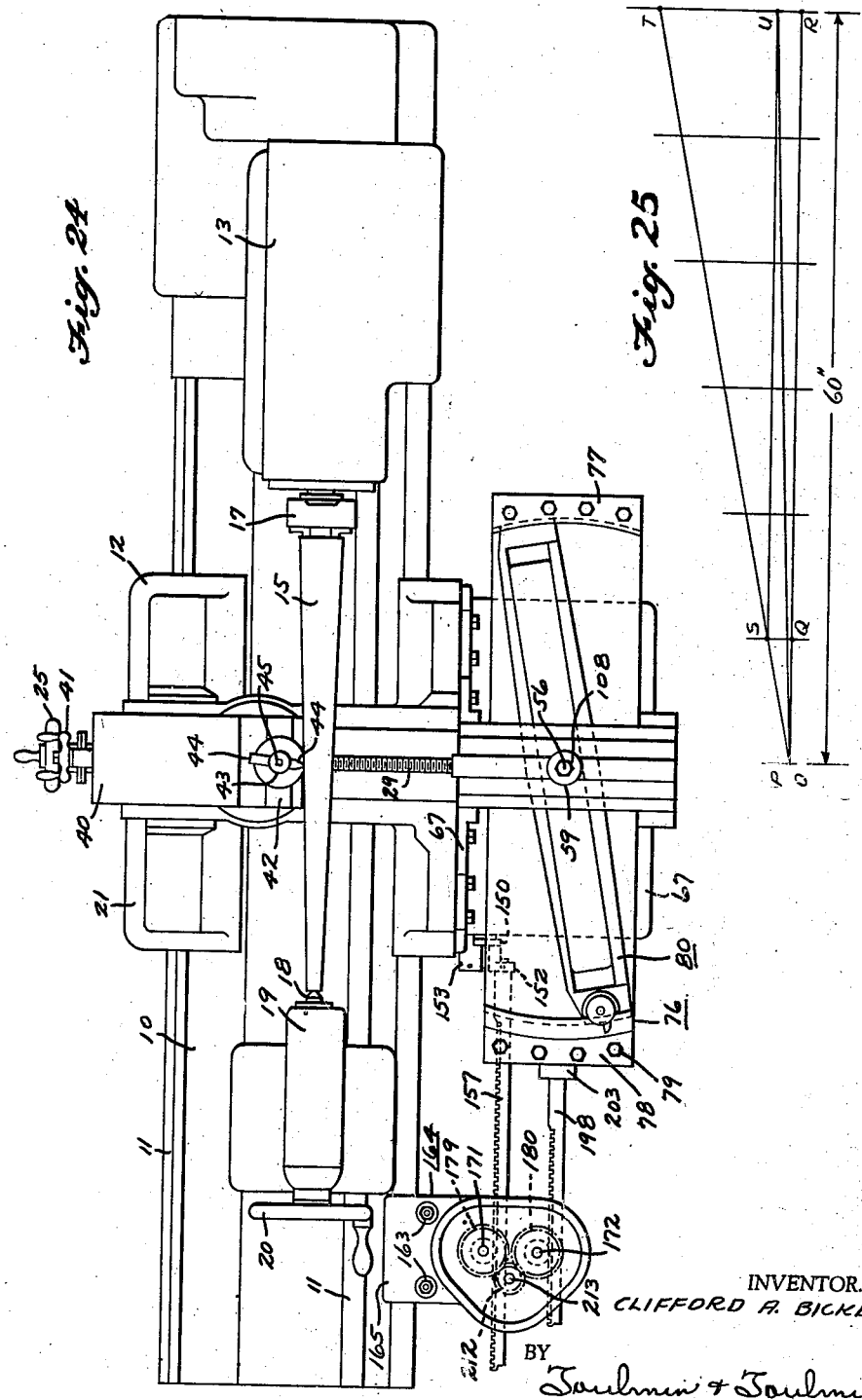
INVENTOR.
CLIFFORD A. BICKEL
BY
Toulmin & Toulmin
ATTORNEY.

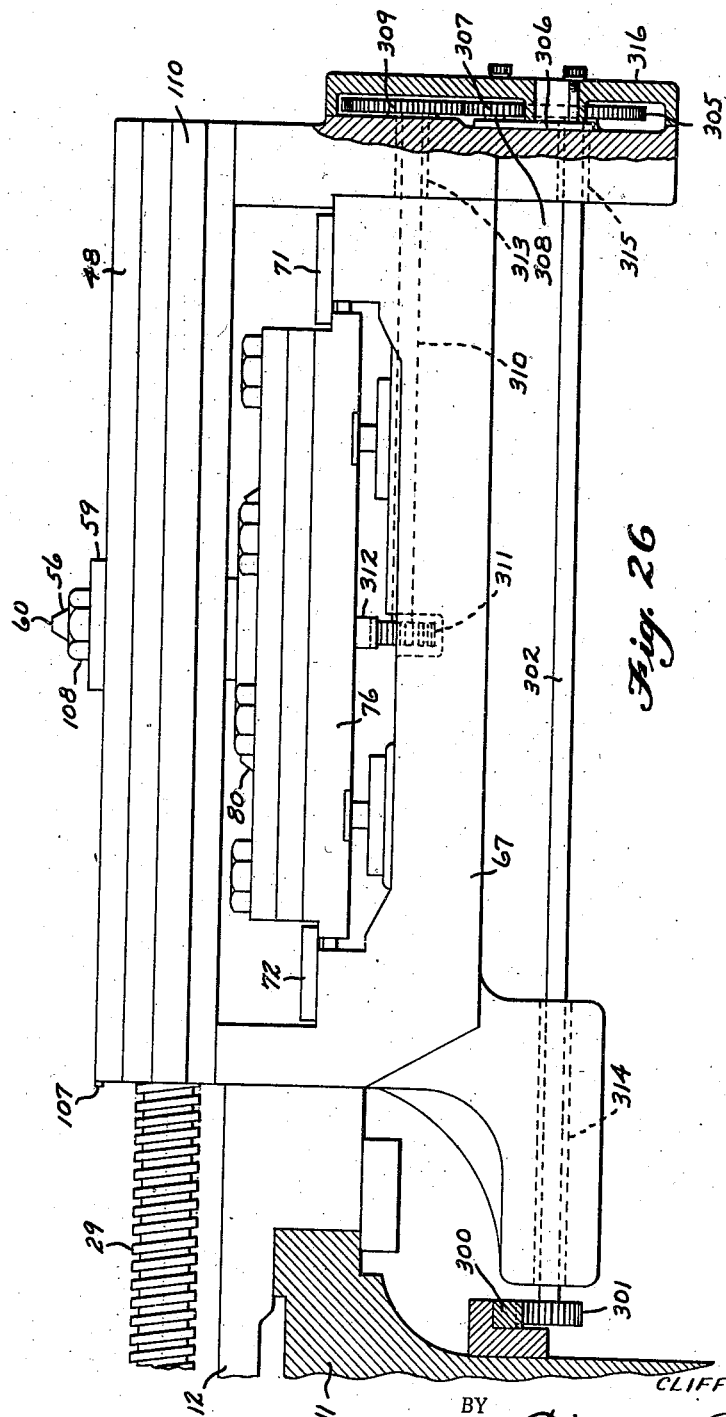

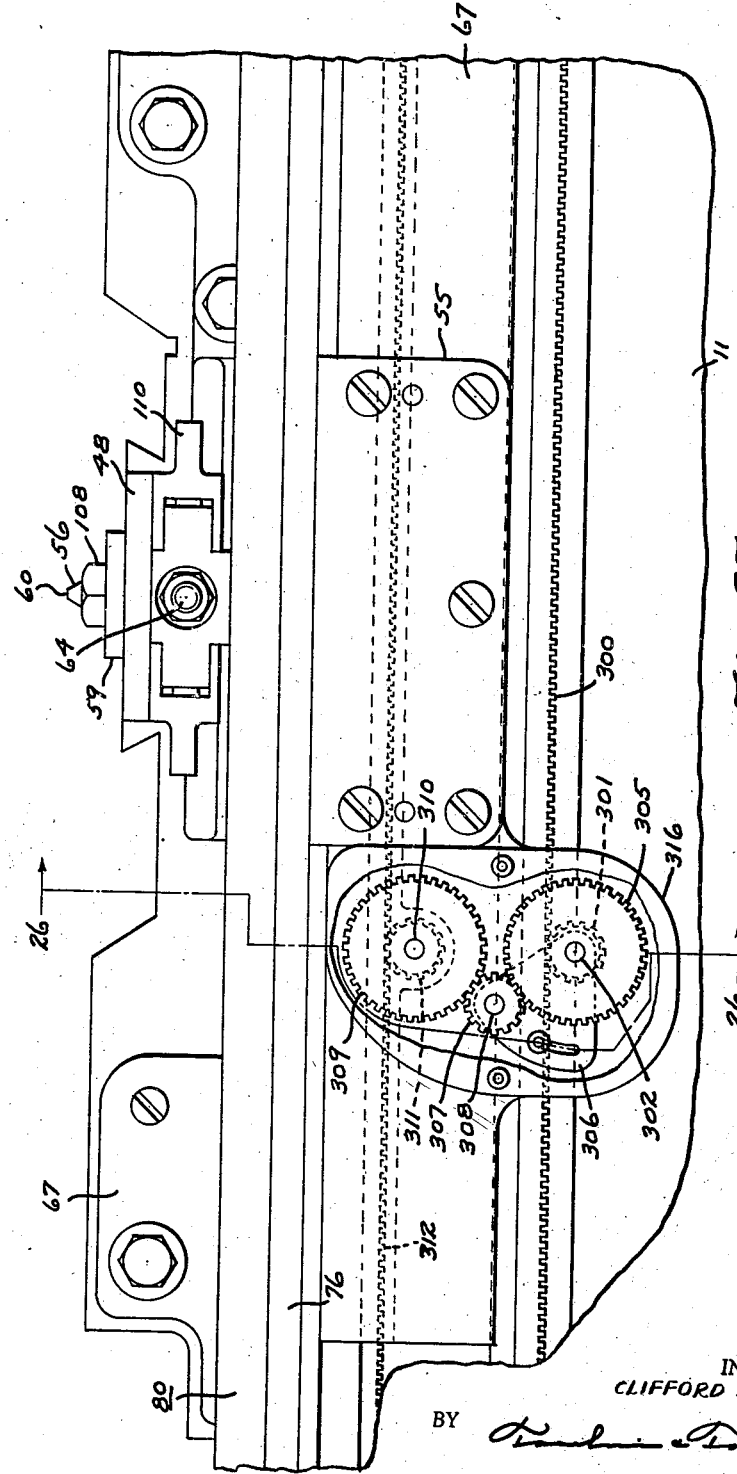

Patented Dec. 26, 1939

2,184,377

UNITED STATES PATENT OFFICE

2,184,377

TAPER FORMING MACHINE

Clifford A. Bickel, Sidney, Ohio, assignor to The Monarch Machine Tool Company, Sidney, Ohio, a corporation of Ohio Application July 26, 1937, Serial No. 155,637

11 Claims. (Cl. 82—17)

This invention relates to turning apparatus, and in particular, to lathes for turning articles having tapers thereon by means of automatically operative taper-turning mechanisms.

One object of this invention is to provide a taper-turning apparatus having means for automatically causing the cutting tool to follow a predetermined path so as to cut a taper with a predetermined angle, the motion of the cutting tool being brought about, in part, by the motion of a follower along an inclined guideway, and partly by the bodily movement of the guideway itself.

Another object is to provide a taper-turning device, wherein the cutting tool is connected to a follower traveling in a guideway which is, itself, caused to travel relatively to the lathe carriage and thereby to impart an additional taper-cutting movement to the cutting tool.

Another object is to provide a taper-machining device for machining tapers of abnormally great angles which are ordinarily outside the range of prior art taper-cutting mechanisms, wherein the cutting tool is connected to a shoe which moves in an inclinable slideway at the same time that the slideway is moved in the opposite direction from the longitudinal movement of the carriage carrying the cutting tool, thereby amplifying the effect of the shoe in the guideway.

Another object is to provide a taper-machining device, wherein the cutting tool is directly connected to the taper follower, which is itself provided with anti-friction bearings engaging guideways, these guideways being formed in a member which is also caused to travel longitudinally in the opposite direction from the carriage, preferably by means of mechanism set in motion automatically by the motion of the carriage.

Another object is to provide a taper-machining device for machining abnormally long tapers of very slight angles, wherein the cutting tool is connected to and caused to respond to the motion imparted to a follower by a guideway, this guideway itself being moved bodily by gearing in the same longitudinal direction as the carriage carrying the cutting tool, this motion being preferably brought about by mechanism operated by the motion of the carriage.

Another object is to provide a method of forming tapered work-pieces from a tool-guiding guideway, wherein the tool is moved longitudinally along the work-piece under the guidance of the inclined guideway while the guideway itself is moved longitudinally relatively to the tool but in the opposite direction.

Another object is to provide a method forming tapered work-pieces from a tool-guiding guideway, wherein the tool is moved longitudinally along the work-piece under the guidance of the inclined guideway while the guideway itself is moved longitudinally relatively to the tool but in the same direction at a different rate of speed.

Another object is to provide a taper-machining device of the type previously mentioned, wherein the taper guideway is moved bodily by gearing on the carriage operated by a pinion engaging a rack attached to the lathe bed.

In the drawings:

Figure 1 is a top plan view of a turning lathe with the taper-turning device of the present invention associated therewith.

Figure 2 is an enlarged plan view of a portion of the apparatus shown in Figure 1, showing the taper-regulating mechanism in greater detail.

Figure 3 is a still further enlarged plan view, partly in section and partly broken away, showing further details of a portion of the taper-regulating mechanism shown in Figure 2.

Figure 4 is a vertical section in the plane of the cross slide screw, taken substantially along the line 4—4 in Figure 1.

Figure 5 is a rear elevational view, partly in section and partly broken away, of the taper-regulating mechanism, looking substantially in the direction of the line 5—5 in Figure 1.

Figure 6 is an enlarged view of the connection between the cross slide screw and the taper-regulating mechanism as shown on the right-hand side of Figure 4.

Figure 7 is an irregular section taken along the line 7—7 in Figure 3, showing the adjustable and non-adjustable anti-friction bearings used in the taper-regulating device.

Figure 8 is a cross section taken along the line 8—8 in Figure 3.

Figure 9 is a section taken along the zigzag line 9—9 in Figure 3.

Figure 10 is a side elevation of the eccentric supporting stud for adjustably mounting the anti-friction bearings used in the taper-regulating device.

Figure 11 is a bottom plan view of the stud shown in Figure 10.

Figure 12 is a top plan view of an enlarged portion of the taper-regulating mechanism shown at the left-hand side of Figure 2, with a portion of the taper-regulating mechanism moved to the right to disclose the mechanism beneath.

Figure 13 is a section along the line 13—13 in Figure 12, showing the connection of the moving mechanism for the taper-regulating device to the latter.

Figure 14 is an enlarged top plan view of the geared bed bracket with the cover plate broken away, as shown at the left-hand side of Figure 2.

Figure 15 is a section along the line 15—15 in Figure 14, showing the connections of the various gearing in the geared bed bracket.

Figure 16 is a left-hand side elevation of the geared bed bracket shown in Figure 14.

Figure 19 is a graphical view showing the relationships existing between certain gear ratios in the geared bed bracket and the tapers cut on work-pieces when the taper-regulating device is set at its maximum angle of approximately 15 degrees from the longitudinal axis.

Figure 20 is a diagrammatic side elevation of the maximum size and taper of work-piece which can be machined, using the taper-regulating device without the gearing in the geared bed bracket.

Figure 21 is a diagrammatic side elevation of a work-piece which may be made by using one-to-one ratio gearing in the bed bracket.

Figure 22 is a diagrammatic side elevation of a work-piece which may be produced with two-to-one ratio gearing in the bed bracket.

Figure 23 is a diagrammatic side elevation of a work-piece which may be made by using three-to-one ratio gearing in the bed bracket.

Figure 24 is a top plan view of a modification of Figure 1, but employing an idler in the bed bracket gearing to enable the use of the apparatus to turn abnormally long and small-angled tapers.

Figure 25 is a view similar to Figure 19, but showing the action of the modified apparatus of Figure 24.

Figure 26 is a side elevation, partly in section, of a modification of Figures 1 and 24, wherein the taper slide is moved by gearing on the carriage operated by a pinion engaging a rack on the lathe bed.

Figure 27 is a rear elevation of the modification shown in Figure 26.

General construction

Figure 18:
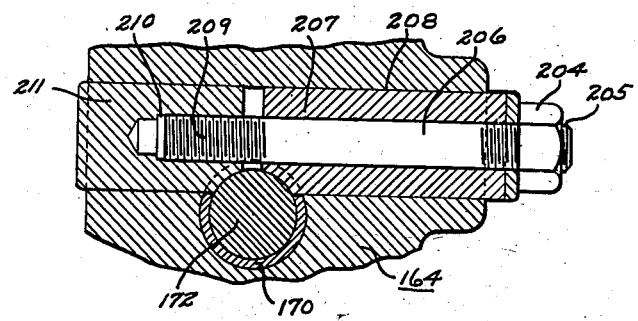
Figure 18 is a section along the line 18—18 in Figure 17, showing the locking mechanism for rendering the gearing of the geared bed bracket inoperative in order to use the apparatus without moving the guideway of the taper-regulating device.
Figure 17:
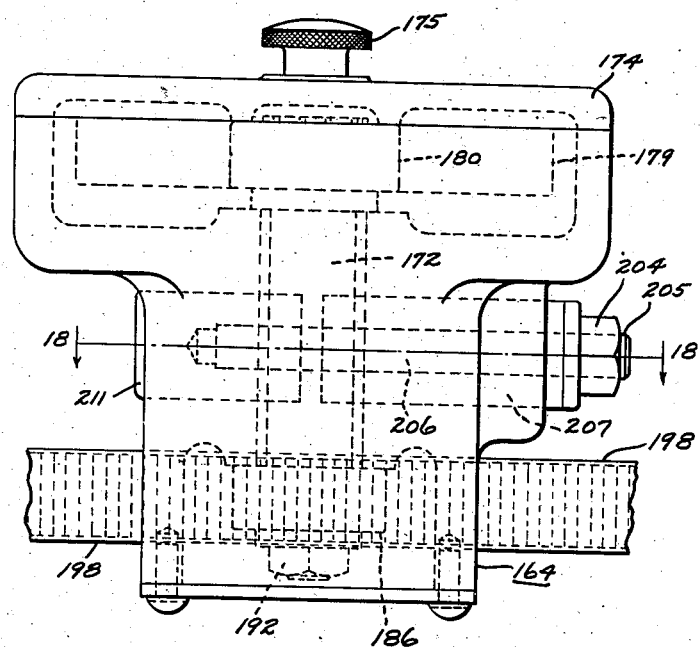
Figure 17 is an end elevation of the geared bed bracket shown in Figure 14.

In general, the taper-turning apparatus of this invention consists of a guideway or swivel which may be attached in any suitable way to the lathe or other machine tool. This swivel is provided with a guideway within which moves a follower member operatively connected to the cutting tool in such a manner that when the guideway is arranged at an angle to the axis of rotation of the work-piece, the follower member moves down the guideway as the carriage moves along the taper machine, thereby causing the tool to move transversely to cut a similar path along the work-piece. In this manner the cutting tool will cut a taper upon the work-piece corresponding to the angle of the guideway to the axis of rotation of the work-piece. Anti-friction bearings are provided between the various parts of the follower member and the cooperating guideway, the latter being itself mounted for reciprocation as a slide. For reciprocating this slide there is provided a bed bracket, attached to the bed of the machine and having intermeshing gearing therein. One of these gears meshes with a rack anchored to the carriage, whereas the other gear meshes with a rack attached to the slide upon which the taper guideway or swivel is mounted. This gearing may be removed and gearing of other ratios substituted in order to vary the range and maximum angle of the taper-cutting mechanism.

Hitherto, the taper-regulating mechanisms of the prior art have been suitable only for cutting tapers of relatively small angles. Accordingly, when an operator attempts to use one of these devices to cut an exceptionally steep taper, the friction set up between the follower and the guide-way in which it moves becomes so great that the follower is either wholly immovable or else must be left so loose in its guideways that the accuracy is impaired. Such friction also gives rise to considerable wear and correspondingly creates inaccuracy in the taper produced.

According to the present invention, antifriction bearings serve to eliminate a large portion of this friction, and the taper-regulating device itself is moved bodily by means of gearing within the bed bracket so that as the carriage moves toward the headstock, the guideway or swivel is moved bodily toward the tailstock. This arrangement multiplies the effect of the taper-regulating mechanism so as to cause it to produce a much steeper taper upon the work-piece than is present in the taper-regulating mechanism itself, as measured by the angle between the guideways of the swivel and the axis of rotation of the work-piece. Oil well drilling tools require abnormally steep tapers, beyond the range of ordinary taper-cutting mechanisms, in the threaded connections between successive sections of the drilling tool. These threaded tapered connections require extreme accuracy of machining because if they are too loose the drill is in danger of coming apart while it is in the ground, whereas if they are too tight the different sections of the drill cannot be assembled and disassembled easily when it is desired to do so.

The apparatus of the present invention may be employed to produce exceptionally long, shallow tapers by reversing the position of one of the racks by which motion is conducted to and from the bed bracket gearing between the carriage and the taper-regulating slide. When the apparatus is thus arranged, the rack drives the bed bracket gear on the opposite side from its normal position for turning steeply tapered work-pieces so that when the carriage moves toward the headstock, the taper-regulating slide also moves in the direction of the headstock instead of toward the tailstock, as when the rack occupies its regular position.

In a modification of the present invention the same result is obtained by interposing an idler gear between the two changeable gears of the geared bed bracket, the racks being left in their original positions. The invention also provides means for clamping the mechanism in the geared bed bracket so that the gearing may be placed temporarily out of action, and the taper-regulating slide locked in a fixed position relatively to the bed of the machine.

Lathe construction

Referring to the drawings in detail, Figure 1 shows a lathe having a bed 10 with longitudinal ways 11 on the upper portion thereof. Upon these ways travels the lathe carriage, generally designated 12, this being moved to and fro in the usual manner by a lead screw (not shown) or by the usual hand wheel and rack (not shown). The lathe is provided with a headstock, generally designated 13, which contains the driving mechanism for rotating the live spindle 14, the work-piece 15 and face plate 17. At its opposite end the work-piece 15 is supported by the dead spindle 18 supported in the tailstock 19, and movable to and fro by means of the hand wheel 20. The tailstock 19 is slidable along the bed of the lathe in the usual manner, and may be clamped in any desired position in customary ways.

The lathe carriage 12 is provided with an apron 21 which extends downwardly in front of the lathe, and which contains the various controls for manually regulating the motion of the carriage. Mounted on the carriage 12 is a support 22, in which is journalled a sleeve 23. Operatively connected to the outer end of the sleeve 23, as by the key 24, is a hand wheel 25 by means of which the sleeve 23 may be rotated manually. Also keyed to the sleeve 23, as by the key 26, is a micrometer head 27, by means of which the feeding motion of the hand wheel 25 may be regulated as to the amount by which it feeds the cutting tool to the work-piece. The support 22 is provided with a corresponding hub-like portion 28 adapted to bear a suitable index mark and a vernier so as to enable the setting of the micrometer head 27 to be accurately regulated.

Supported within the sleeve 23 is the outer end of the cross feed screw 29, having screw threads 30 in its intermediate portion. The outer end of the cross feed screw 29 is provided with a keyway 31 adapted to receive a key 32, secured to the sleeve 23 in such a manner as to form a driving connection therebetween and yet to permit the cross feed screw 29 to be moved telescopically into and out of the sleeve 23. The inner end of the sleeve 23 is provided with teeth forming a driving pinion 33 which meshes with a drive gear 34, mounted upon a jack shaft 35 within the apron 21. The drive gear 34 is operatively connected by means of conventional gearing to the feed rod of the lathe so that the rotation of the feed rod will cause the rotation of the drive gear 34, with consequent rotation of the sleeve 23 and the cross feed screw 29.

Reciprocably mounted on the portion 36 of the carriage 12 is the bottom slide 37, to which is secured the cross feed nut 38, as by the bolts 39. Consequently, when the cross feed screw 29 is rotated the nut 38 is caused to move along the threaded portion 30, and carries the bottom slide 37 to and fro in a direction transverse to the longitudinal ways 11 on the lathe bed. The bottom slide 37 is provided with the usual compound slide or tool slide 40 (omitted for sake of clearness from Figures 2 to 5, inclusive, but shown in Figure 1). The tool slide 40 is of conventional construction, and is supported slidably upon the bottom slide 37 in such a manner as to be moved to and fro relatively thereto when the hand crank 41 (Figure 1) is rotated by the operator. The tool slide 40 is provided with a slotted portion 42, within which is mounted the tool post 43 having the cutting tool 44 held thereby. The tool post clamping screw 45, when rotated in one direction, serves to clamp the tool post 43 in the grooved portion 42 and also to firmly secure the tool 44 within the tool post 43. The compound slide 40 is also capable of being swung angularly in the usual manner, it being provided with a turntable portion 46, which cooperates with a similar portion 47 upon the bottom slide 37.

*Taper-regulating mechanism*

The right-hand end of the cross feed screw 29 (Figure 4) is provided with a reduced diameter portion 50, which is journalled in bearings 51 (Figure 6) and provided with anti-friction thrust bearings 52 and 53. The bearings 51 may be of any suitable type, the type illustrated consisting of bronze bushings. The bearings 51 are mounted in the carriage shoe 54, which is slidably mounted in the guide members 110 (Figure 8), upon which rest the elongated plates 48. The carriage shoe 54 is provided with a threaded hole 58 adapted to receive the threaded portion 57 of the threaded stud 56, the latter having a washer 59. An oiling connection 60 in the threaded stud 56 opens into a passageway 61 therethrough, so that the space 62 around the reduced diameter portion 50 may be filled with lubricant to lubricate the bearings 51, 52 and 53. The retaining nut 63, threaded onto the threaded end 64 of the cross feed screw 29, engages a washer 65, which in turn, engages the thrust bearing 53 and holds in assembly the parts associated with the cross feed screw 29. The bushings 51 are provided with passages 66 for the conduction of lubricant thereto and to the bearings 52 and 53.

The guide bracket 55 is secured to the taper device supporting bracket 67 by the bolts 68. The taper device supporting bracket 67 is secured to the carriage 12 by means of cap screws 69 (Figures 2 and 3), and aligned therewith by dowel pins (not shown). The supporting bracket 67 is provided with slideways 70 and 71, provided with retaining portions 72 and 73, respectively. Mounted in recesses in the slideways 70 and 71 are anti-friction bearing assemblies 74 of a special type, hereinafter described in detail. The supporting bracket 67 is also provided with anti-friction bearing assemblies 75.

The slide 76 rests upon the anti-friction bearing assemblies 75, and slides between the anti-friction bearing assemblies 74 mounted in recesses in the ways 70 and 71. The bearings 75 thus support the weight of the slide 76, whereas the bearings 74 resist the thrust upon the slide while the device is in operation. On the ends of the slide 76 are mounted the swivel clamps 77 and 78 (Figure 2), being secured thereby to the bolts 79. The swivel clamps 77 and 78 (Figure 5) are provided with overhanging arcuate edges, beneath which are arranged the opposite ends of the swivel 80. The swivel clamp 78 is additionally provided with an arcuate rack 81 meshing with a pinion 82 mounted upon a shaft 83, supported in the bracket 84 upon one end of the swivel 80, and having a hand wheel 85 for rotating the pinion 82. An index pointer 86 cooperates with scales 87 and 88 upon the swivel clamp 78 so as to indicate the amount by which the swivel 80 is displaced from its position parallel with the ways 11 of the lathe bed. The swivel 80 may be locked in any position of adjustment by tightening the bolts 79, thereby clamping the flanged edges of the swivel clamps 77 and 78 tightly down upon the ends of the swivel 80.

The slide 76 (Figure 6) is provided centrally with a swivel stud 100, upon which is threaded the retaining nut 101. The swivel stud 100 is provided with a head 102 which serves to provide a pivotal support for the opposite sides of the swivel 80. Engaging these opposite sides are anti-friction bearing assemblies 103, of a type similar to the bearings 74 and 75 and mounted upon the carriage shoe slide 104 (Figures 3 and 6), the center of which is provided with a bore 105 which serves to pivotally receive the stem portion 106 of the carriage shoe 54. A dust cover 107 is held in position by the washer 59, which in turn, is engaged by the nut 108 of the threaded stud 56. The carriage shoe 54 is likewise provided with anti-friction bearings 109 (Figure 8) engaging the guide members 110. The latter are secured at their opposite ends to the taper device supporting bracket 67 and guide bracket 55 by the screws 111 and dowel pins 112, and by the screws 113 and dowel pins 114, respectively (Figures 2 and 3).

Arranged between the stem portion 106 and the bore 105 is a bearing bushing 115. Beneath this is a disc 116, secured to the stem 106 by the screws 117, and having a projecting portion entering the locating hole 118. The oil passages 119 serve to distribute lubricant to the bearing bushing 115 from the space 62. The guide members 110 and the swivel 80 are constructed from hardened steel, and the slide 76 is also provided with hardened steel bearing strips 251 and 252 secured thereto by the screws 253 for engagement by the anti-friction bearings.

The anti-friction bearing assemblies hitherto designated by reference numerals 74, 75, 103 and 109, are shown more in detail in Figures 7 to 11, inclusive. Each bearing assembly consists of inner and outer annular races 120 and 121, respectively, with bearing balls 122 arranged therebetween. The inner race 120 is variously mounted, according to the location of the bearing assembly. In the bearing assemblies 74 the inner race 120 is mounted upon stud bolts 124 or 125. In the stud bolt 124 the portion upon which the inner race 120 of the single bearing is mounted is coaxial with the bearing race. The stud bolts 125, however, as shown in Figure 10, are provided with eccentric portions 126, upon which the inner race 120 is mounted. Consequently, the position of the bearing may be adjusted by loosening the nuts 127 and 128 (Figure 5), by which each stud bolt is held in position, whereupon the bolt may be turned until the bearing is shifted by a sufficient amount to bring it into engagement with the part which it supports. One bearing assembly 74 on the inner side of the slide 76 is mounted upon the plain or coaxial stud bolt 124, whereas the remainder of the bearing assemblies 74 are mounted upon eccentric stud bolts 125, as shown in Figure 3. By this means the bearing assemblies 74 can be accurately adjusted against the sides of the slide 76, the bearing assembly 74 upon the plain stud bolt 124 serving as a point of reference.

The bearing assemblies 75, supporting the weight and vertical thrust of the slide 76, are mounted in two different manners, as shown in Figure 3. The bearing assemblies 75 at the opposite ends of the supporting bracket 67 are mounted upon stud bolts 129 secured in bearing brackets 130. The bearing assemblies 75, arranged in the supporting bracket 67 between the opposite ends thereof (Figures 3 and 9), are mounted upon pins 130a, the opposite ends of which are secured in transverse bores 131a in sleeves 132, having flanges 133 by which the sleeves are held within the bores 134, as by the screws 135.

Two of the bearing assemblies 103 (Figure 7) are mounted within slots 136 in the corners of the carriage shoe slide 104, and are supported upon pins 137 in vertical bores 138. The other two bearing assemblies 103 are mounted upon the eccentric portions 139 of stud bolts 140, held in position by the nuts 141 and locknuts 142. By loosening the nuts 141 and 142 the eccentric stud bolts 140 may be rotated to adjust the clearance between the bearing assemblies 103 and the inner sides of the swivel 80.

The bearing assemblies 109 are similarly supported in slots 143 in the corners of the carriage shoe 54 (Figures 3 and 8). Two of these bearing assemblies 109 are mounted upon pins 144, whereas the other two are mounted upon the eccentric portions 145 of the stud bolts 146 having the nuts 147 and locknuts 148. By loosening the nuts 147 and 148, the stud bolts 146 may be rotated so that the clearance between the bearing assemblies 109 and the guide members 110 may be accurately adjusted.

Secured to one end of the taper device supporting bracket 67, as by the screws 150, is a rack bracket, generally designated 151, having oppositely disposed portions 152 and 153, with sockets 154 and 155, respectively. Only one of these sockets 154 or 155 is in use at a given time. The socket selected for use receives the reduced end portion 156 of a rack 157, having teeth 158. The rack is secured to the bracket portion 152 by any suitable means, such as by the taper pin 159 in the hole 160. The bracket portion 153 similarly is provided with a hole 161 for the taper pin 159 when the rack 157 is shifted from the socket 154 to the socket 155. Under these conditions, however, for reasons which will hereinafter appear, the rack teeth 158 are caused to face in the opposite direction when the rack is transferred from the socket 154 to the socket 155, or vice versa (Figures 12, 13 and 14).

Secured to the edge rib 162 of the lathe, as by the bolts 163, is a geared bed bracket, generally designated 164. For this purpose the bed bracket 164 is provided with an extension 165 overhanging the edge rib 162, the latter being engaged on its under side by a clamping member 166, clamped thereagainst by the bolts 163. The bed bracket 164 is provided with a pair of vertical bores 167 and 168, containing bearing bushings 169 and 170, rotatably receiving the vertical shafts 171 and 172, respectively. The bed bracket 164 is also provided with a recess or depression 173, closed by a cover plate 174, held in position by the thumb nuts 175 engaging the threaded studs 176. The upper ends of the shafts 171 and 172 are splined, as at 177 and 178, respectively, (Figures 14 and 15) and upon these are mounted the intermeshing gears 179 and 180, respectively. The lower portion of the bed bracket 164 is provided with recesses 181 and 182, into which the lower ends of the shafts 171 and 172 pass. Keyed to the lower ends of these shafts, on the reduced diameter portions 183 and 184, respectively, are the pinions 185 and 186, as by the keys 187 and 188.

Washers 189 and 190 and nuts 191 and 192, threaded upon the lower ends of the shafts 171, serve to retain the pinions 185 and 186 in position. The pinion 185 meshes with teeth 158 upon the rack 157, which passes through a bore 193 having a bearing bushing 194 therein. On the opposite side of the pinion 185 and aligned with the socket 155 in the bracket portion 153 (Figure 12), is a similar bore 195 containing a similar bearing bushing 196. This bore 195 is used only when the rack 157 is transferred from the socket 154 to the socket 155, as in the case when it is desired to cut extremely long and shallow tapers, as shown in dotted lines in Figure 15. The normal arrangement of the rack 157 for cutting extremely steep tapers is as shown in solid lines in Figure 15.

Meshing with the pinion 186 are the teeth 197 of a rack 198, the latter reciprocating in a bearing bushing 199 mounted in a bore 200 within the bed bracket 164. The opposite end of the rack 198 is threaded, as at 201, and is secured within the threaded socket 202 of the boss 203 on the slide 76. Consequently, when the lathe carriage 12 moves in the direction of the headstock, or to the right in Figures 12 and 14, the rack 157 will move to the right, rotating the gear 185 and shaft 171 in a counterclockwise direction. The consequent rotation of the gear 179 causes the gear 180, shaft 172 and pinion 186 to rotate in a clockwise direction, thereby moving the rack 198 to the left and consequently moving the slide 76 and swivel 80 in the direction of the tailstock.

In order to disable the mechanism of the bed bracket 164 temporarily, as when it is desired to employ the taper-regulating device without the multiplying gearing of the bed bracket 164, one of the gears 179 or 180 is removed, or one of the racks 157 or 198 disconnected. The shaft 172 is then locked tightly by turning the nut 204 on the threaded end 205 of the stud 206 (Figures 14 and 18), which passes through the locking bushing 207 mounted within the bore 208 of the bed bracket 164. The opposite threaded end 209 of the stud 206 is seated in a threaded socket 210 of the locking plug 211. The tightening of the nut 204 urges the locking bushing 207 toward the locking plug 211 and into engagement with the shaft 172. This locks the shaft 172, the pinion 186 and the rack 198 rigidly in position so that the rack 198 merely serves as an anchor rod running to the now immovable slide 76.

*Arrangement for machining long, shallow tapers*

The apparatus previously described has been described and illustrated particularly with reference to the turning of steep tapers. The apparatus may, however, be used for turning long, shallow tapers by arranging the mechanism so that the slide 76 will be moved in the same direction as the lathe carriage 12. This may be done as shown in dotted lines in Figure 15 by removing the rack 157 from its socket 154 and bushing 194, and transferring it to the socket 155 and bushing 196. At the same time the teeth 158 are turned in the opposite direction so that they now mesh with the teeth of the pinion 185 on the opposite side thereof from the position shown in Figure 15. The taper pin 159 is then placed in the hole 161 (Figure 12) to anchor the rack 157 in its shifted position. Under these circumstances, when the carriage 12 moves to the right, the rack 157 will move to the right, causing the pinion 185 to move in a clockwise rather than a counter-clockwise direction, as before. The shaft 171 and gear 179 accordingly rotate in a clockwise direction, causing the gear 180, the shaft 172 and the pinion 186 to rotate in a counter-clockwise direction. This action causes the rack 198 to move to the right, thereby causing the slide 76 and swivel 80 to move in the same direction as the lathe carriage 12, but at a different rate of speed.

The foregoing result of elongating the effect of the taper-regulating device may also be obtained by the modified apparatus shown in Figure 24. In this apparatus the general construction is the same as that previously described. It will be observed, however, that the teeth of the gears 179 and 180 in the geared bed bracket 164 do not mesh with each other but are spaced apart from each other. The drive between these two gears 179 and 180 is brought about by means of an idler pinion 212 mounted on a shaft 213 and meshing with the teeth of the gears 179 and 180. In this manner the direction of rotation of the gear 180 is reversed from the direction of rotation of the same gear in Figures 1 and 14, so that when the lathe carriage 12 moves toward the headstock 13 the taper slide 76 likewise moves toward the headstock 13. In this manner, as in the previously described construction of reversing the position of the rack 157 in the bracket 151, a relatively short taper-regulating device may be employed to produce a greatly elongated work-piece 15, having a very shallow taper. The gears 179 and 180, in Figure 24, like the same gears in Figure 14, are removable and interchangeable so that the drive ratio may be altered. The shaft 213 is therefore mounted upon a movable base (not shown) so that the idler pinion 212 may always be brought into mesh with the two gears 179 and 180 regardless of their relative sizes.

*Operation*

In the operation of the taper-regulating device of this invention, the swivel 80 is set at the desired angle of taper by turning the hand wheel 85 and setting the index pointer 86 opposite the proper graduations upon either of the scales 87 or 88. The swivel is then clamped in position by tightening the clamping bolts 79, thereby bringing the end clamps 77 and 78 tightly into engagement with the swivel 80. The bolts 163 are likewise tightened in order to clamp the geared bed bracket 164 to the edge rib 162, and the nut 204 is loosened in order to release the shaft 172 for free rotation. The proper gears 179 and 180 are chosen, according to the particular gear ratio desired, and these are then placed upon the splined portions 177 and 178 of the shafts 171 and 172 (Figure 14).

The clamping nut 108 upon the threaded stud 56 is then loosened so as to free the shoe 54 from its engagement with the guide members 110. This allows the cross feed assembly to travel inwardly or outwardly, according to the angle at which the swivel 180 is set. The cutting tool 46 is then set to the desired position by turning the hand wheel 25 (Figure 4) because of the telescoping arrangement of the cross slide screw shaft 29 within the sleeve 23, there being no interference between these two members although a driving connection is obtained.

The determination of the proper gear ratio will depend upon the angle of taper which is to be machined upon the work-piece. Assuming that the taper-regulating device, unaided by the bed bracket gearing, has a maximum travel of 12 inches and a total turning angle of 30 degrees included angle, or an angle of 15 degrees between the surface of the taper and the axis of rotation. If the gears 179 and 180 are chosen to have a one-to-one ratio, such as when each has sixty teeth, it will be seen from Figure 19 that the half angle, that is, the angle between the surface of the taper and the axis of rotation, will be increased from 15 degrees in the taper-regulating device to approximately 28½ degrees at the cutting tool. In Figure 19 the point A, marked zero, indicates the starting point in the operation of the device.

As the taper carriage moves a distance of one unit from the point A to the point B, such as one inch, the taper slide 76 will move an equal distance of one unit from the point A to the point C in the opposite direction. The inner section of the perpendicular from this point C to the point G on the line BF, indicating the maximum unassisted half angle (15 degrees) of the taper-regulating device, and the drawing of a horizontal line from this point of intersection back to the perpendicular AH from the starting point A, gives the point J on the starting line AH. The inclined line BJ then gives the angle of taper which will be produced by one-to-one gearing in cooperation with the taper-regulating device, when the latter is set at its maximum angle. Obviously, other settings of less than the maximum angle of the taper-regulating device will produce corresponding changes in the taper produced on the work-piece.

Under these circumstances, with one-to-one ratio gearing, the cutting tool 44 moves outwardly approximately twice as rapidly as it would if the taper slide 76 were stationary, this doubling of its movement being caused by the travel of the slide 76 in the opposite direction. It will be seen, however, that whereas an increasing of the range of the taper-regulating device is obtained in this manner, thereby enabling steeper tapers to be cut, nevertheless, the total length of taper which may be cut is reduced to half its normal length. Thus, if a taper of twelve inches may be cut with the taper-regulating device set in a stationary position, the taper of about six inches in length can be cut when one-to-one gearing is used in the geared bed bracket 164. With such gearing, however, the turning angle of the lathe is increased to approximately 57 degrees total included angle, as compared with 30 degrees obtainable with the unassisted taper-regulating device locked in a stationary position.

By using gears 179 and 180 with a two-to-one ratio, the total taper angle can be increased to approximately 77.5 degrees from a maximum setting of 30 degrees total angle of the taper-regulating device. This is likewise seen from Figure 19. When the machine is thus arranged with two-to-one ratio gearing and the carriage 12 moves one unit of distance to the left from A to B, the taper slide 76 will move two units to the right in the same time, and will reach the point D. The perpendicular from D intersects the line BF at the point K, and the horizontal line drawn from K intersects the starting perpendicular AH at L. The inclined line BL then indicates the maximum half angle obtainable on a work-piece, using a 15-degree half angle upon the taper-regulating device and two-to-one ratio gearing. The half angle ABL is equal approximately to 38.75 degrees, hence, the total included angle of the taper upon the work-piece will be approximately 77.5 degrees. At the same time, however, the maximum length of taper obtainable will be still further cut down, namely, to one-third of the length of taper obtainable by the use of a stationary taper-regulating device. Accordingly, if the maximum travel of the shoe upon the taper-regulating device is 12 inches, the maximum length of taper obtainable will be 4 inches.

To increase still further the maximum range of the machine, gears 179 and 180 of a three-to-one ratio may be selected. As the lathe carriage 12 moves one unit to the left (Figure 19), the taper slide 76 will then move three units to the right, reaching the point E. The perpendicular from E intersects the line BF at M, and the horizontal line from this point of intersection M intersects the starting perpendicular AH at N. The inclined line BN then represents the angle of the surface of the taper to the axis of rotation BOE; that is, the angle ABN is the half angle of the taper of approximately 47 degrees. Thus, a taper of approximately 94 degrees may be cut in this manner with a taper-regulating device having a maximum range of 30 degrees total included angle when stationary. Here also the length of the taper is again reduced, this time to one-fourth of the length of the taper travel upon the taper-regulating device. Thus, where the latter has a total travel of 12 inches, the maximum length of taper of 94 degrees will be 3 inches.

Figure 20 shows a taper of 30 degrees included angle which may be obtained from the taper-regulating device when the taper slide 76 is locked in a stationary position, this taper having a length of 12 inches. Figure 21 shows the maximum taper of work-piece obtainable when one-to-one ratio gearing is used. It will be seen that the total angle of the taper is increased to 57 degrees, and its length reduced to 6 inches. Figure 22 shows the maximum taper obtainable when two-to-one ratio gearing is employed. The taper has a total included angle of 77.5 degrees and a maximum length of 4 inches. Figure 23 shows the maximum taper obtained when gearing of three-to-one ratio is employed, the work-piece having a total included angle of 94 degrees and a length of 3 inches. Obviously, any desirable setting of the apparatus may be made within its maximum limits merely by setting the swivel 80 at its proper angle in order to produce the desired angle upon the work-piece, with the particular ratio of gears 179 and 180 which has been chosen.

With the gears so chosen the carriage feeding mechanism is started and the carriage 12 moves toward the headstock 13. The shoe 104 then moves along the space between the opposite sides of the swivel 80. Meanwhile, however, the latter is moving toward the tailstock 19 by reason of the gearing 179 and 180 and the racks 157 and 198. The tool 44 will therefore cut the increased taper upon the work-piece 15 corresponding to the amount described in connection with Figure 19.

If it is desired to use the taper-regulating device unassisted by the gearing in the geared bed bracket 164, the mechanism thereof is disabled either by removing one of the gears or the rack 157, after which the nut 204 (Figure 14) is tightened to clamp the shaft 172 in a non-rotatable position. Under these conditions, the rack 198 serves as an anchor rod and holds the taper slide 76 and the swivel 80 in a stationary position, while the shoe slide 104 moves along the guideways in the swivel 80. Under these conditions, the tool 44 cuts a taper upon the work-piece 15 corresponding directly to the angle at which the swivel 80 is set. If it is desired to cut a non-tapered portion, such as a cylinder, upon the work-piece, the bolts 163 are loosened, thereby allowing the bed bracket 164 to slide along the edge rib 162.

To turn work-pieces with an abnormally elongated taper, as described in connection with the reversal of the rack 157, so that the rack 198 and taper-regulating device are caused to move in the same direction as the lathe carriage 12, the rack 157 is removed from its socket 154 (Figure 12) and placed in the socket 155 with its teeth 158 facing in the opposite direction and meshing with the teeth of the pinion 185 on the opposite side thereof, as indicated by the dotted lines in Figure 15. The gearing of the proper ratio is then selected, according to the principles shown in Figure 25, which is analogous to Figure 19 previously described. The starting point is indicated by the point P. The gearing 179 and 180 must have a ratio greater than one-to-one because with one-to-one ratio gearing, as the lathe carriage 12 moves one unit of length toward the headstock, the taper slide 76 will also move the same amount in the same direction, and the cutting tool 44 will therefore move in a straight line.

Let it therefore be assumed, for purposes of example, that a tapered work-piece is to be cut with a diameter at its large end of 6.5 inches and at its small end of 2 inches, with a length of 60 inches. It will be assumed that the taper-regulating device has a maximum travel of 12 inches, hence, it is necessary for the lathe carriage 12 to move 60 inches while the shoe slide 104 moves 12 inches. The proper gears 179 and 180 are therefore selected to give a ratio of 1.25-to-one, from which a simple proportion gives the maximum taper per foot which can be turned in a 60-inch length, this being 1.3 inches per foot. Another proportion using this figure and the taper per foot on the work-piece of 1.25 inches, gives the true setting of the taper-regulating device index plate to be 6.25 inches. Any desired taper per foot can be cut with the same set of gears 179 and 180 up to the maximum taper for the longest setting.

The same principles apply with the operation of the arrangement shown in Figure 24, where the idler gear 212 is used to reverse the drive instead of reversing the position of the rack 157. In the operation of the arrangement for cutting abnormally long, shallow tapers, the procedure is similar to that previously described for cutting steep tapers of short lengths. The reversal of the drive in the bed bracket 164, however, causes the taper slide 76 to move toward the headstock 13 instead of toward the tailstock 19, when the carriage 12 is moved toward the headstock 13. Such an arrangement for turning abnormally long tapers may be used, for example, in turning gun barrels. The effect of this arrangement is, of course, to lengthen out the taper-regulating device so that its range of operation in length is greatly increased, while its maximum angle of taper is reduced. The effect is, therefore, exactly the opposite of the arrangement shown in Figure 1 for cutting abnormally steep tapers.

Figure 25 shows graphically, in a manner analogous to Figure 19, the effect of using the device with a reversed drive to turn abnormally long, shallow tapers. As the taper slide 76 moves one unit from the starting point P to the point Q, the carriage will move five units to the point R. The perpendicular from the point Q to the line PT representing the maximum angle of the taper-regulating device, intersects at S and the horizontal line drawn from the point S to the perpendicular raised at R intersects at the point U. The inclined line OU, therefore, represents the angle of taper obtainable with the gearing chosen.

In the modification shown in Figures 26 and 27, the taper slide is moved by a rack thereon operated by gearing driven from a rack mounted on the lathe bed. It avoids the need of having to allow space at the end of the lathe bed for the ends of the racks 157 and 198 to project into, especially in the case of lathes with long beds, where these racks would extend a considerable distance beyond the bed.

In this modification a rack 300 is bolted to the rear of the lathe bed 10 and is engaged by a pinion 301 mounted on a shaft 302, journalled at 314 and 315 in the brackets 303 and 316 depending from the carriage bracket 67. The opposite end of the shaft 302 carries a pick-off gear 305 which meshes with an idler 307 on the stud 308, attached to the quadrant 306 mounted upon the bracket 316. The idler 307 meshes with a pick-off gear 309 on the shaft 310 journalled at 313 in the carriage bracket 67, and carrying at its opposite end the pinion 311 meshing with the rack 312 attached to the taper slide 76. A cover plate 304 covers and protects the pick-off gears 305 and 309 and the idler 307. By removing the idler 307 and causing the pick-off gears 305 and 309 to mesh directly, the direction of motion of the taper slide 76 is reversed for a given direction of motion of the carriage 12.

In operation, using the idler 307, as the carriage 12 is moved toward the headstock 13, the shaft 302 and gear 305 (Figure 27) are rotated counterclockwise, thereby rotating the gear 309 counterclockwise, by the action of the pinion 301 in moving along the stationary rack 300. This action causes the pinion 311 to move the rack 312 and the taper slide 76 to the left, or in the opposite direction from the carriage 12 and cutting tool 44. Under this arrangement a relatively long taper guideway with a relatively small inclination can be employed to turn a short steeply tapered work-piece.

To use this modified apparatus to turn a long work-piece with a relatively shallow taper from a short taper guideway, the idler 307 is removed and the pick-off gears 305 and 309 replaced by larger gears which mesh directly. For the same motion of the carriage as before, the rack 312 and taper slide 76 will move in the same direction as the carriage 12 and at a speed depending upon the ratios of the teeth upon the gears 305 and 309, these being preferably chosen to give the taper slide 76 a slower speed than the carriage 12.

It will be understood that I desire to comprehend within my invention such modifications as come within the scope of the claims and the invention.

Having thus fully described my invention, what I claim as new and desire to secure by Letters Patent, is:

1. In a machine tool, a bed, a stationary support mounted on said bed and positionally adjustable relatively thereto, a workpiece-rotating element, a carriage, means for moving said carriage along said bed, a tool mounted on said carriage, an angularly disposable guide slidably mounted on said carriage, a follower engaging said guide, a connector between said follower and said tool, a first rack connected to said guide, gearing on said stationary support meshing with said first rack, and a second rack anchored to said carriage and meshing with said gearing for actuating said gearing and said first rack to move said guide relatively to said carriage and said bed in response to the motion of said carriage along said bed.

2. In a machine tool, a bed, a stationary support mounted on said bed and positionally adjustable relatively thereto, a workpiece-rotating element, a carriage, means for moving said carriage along said bed, a tool mounted on said carriage, an angularly disposable guide slidably mounted on said carriage, a follower engaging said guide, a connector between said follower and said tool, a first rack connected to said guide, gearing on said stationary support meshing with said first rack, and a second rack anchored to said carriage and meshing with said gearing for actuating said gearing and said first rack to move said guide relatively to said carriage and said bed in response to the motion of said carriage along said bed, said gearing on said stationary support including interchangeable change speed gears for imparting adjustably variable speeds to said guide for a given speed of said carriage along said bed.

3. In a machine tool, a bed, a stationary support mounted on said bed and positionally adjustable relatively thereto, a work-piece rotating element, a carriage, mechanism for moving said carriage relatively to said bed, a tool associated with said carriage, an angularly disposable guide slidably mounted on said carriage, gearing on said stationary support operatively connected to said guide, and means responsive to the motion of said carriage along said bed for actuating said gearing to move said guide relatively to said bed and said carriage.

4. In a machine tool, a bed, a stationary support mounted on said bed and positively adjustable relatively thereto, a work-piece rotating element, a carriage, mechanism for moving said carriage relatively to said bed, a tool associated with said carriage, an angularly disposable guide slidably mounted on said carriage, a rack connected to said guide, gearing on said stationary support meshing with said rack, and means responsive to the motion of said carriage along said bed for actuating said gearing to move said rack and said guide relatively to said bed and said carriage.

5. In a machine tool, a bed, a stationary support mounted on said bed and positively adjustable relatively thereto, a work-piece rotating element, a carriage, mechanism for moving said carriage relatively to said bed, a tool associated with said carriage, an angularly disposable guide slidably mounted on said carriage, a rack connected to said guide, gearing on said stationary support meshing with said rack, and a second rack anchored to said carriage and meshing with said gearing, said second rack being responsive to the motion of said carriage along said bed for operating said gearing to actuate said first-mentioned rack to move said guide relatively to said bed and said carriage.

6. In a machine tool, a bed, a work-piece rotating element, a tool, an angularly disposable guide, a follower engaging said guide, a connector between said follower and said tool, a rack connected to said guide, gearing operatively connected to said rack, and a second rack operatively connected to said gearing for actuating said gearing and said first-mentioned rack to move said rack relatively to said bed, one of said racks being adjustably movable to oppositely engage said gearing whereby to reverse the direction of motion of said guide relatively to said bed.

7. In a machine tool, a bed, a work-piece rotating element, a tool, an angularly disposable guide, a follower engaging said guide, a connector between said follower and said tool, a slide for supporting said guide, means for angularly adjusting said guide relatively to said slide, a rack connected to said slide, gearing operatively connected to sad rack, and a second rack operatively connected to said gearing for actuating said gearing and said first-mentioned rack to move said guide relatively to said bed, one of said racks being adjustably movable to oppositely engage said gearing whereby to reverse the direction of motion of said slide relatively to said bed.

8. In a machine tool, a bed, a work-piece rotating element, a carriage, mechanism for moving said carriage relatively to said bed, a tool associated with said carriage, an angularly disposable guide, a rack connected to said guide, gearing operatively connected to said rack, a second rack operatively connected to said gearing, and means responsive to the motion of said carriage for operating said second rack to actuate said gearing and said first-mentioned rack to move said guide relatively to said bed and said carriage, one of said racks being adjustably moable to oppositely engage said gearing whereby to reverse the direction of motion of said guide relatively to said bed.

9. In a machine tool, a bed, a work-piece rotating element, a carriage, mechanism for moving said carriage relatively to said bed, a tool associated with said carriage, an angularly disposable guide having a rectilinear guideway, a slide for supporting said guide, a follower engaging said guideway, a connector between said follower and said tool, a rack connected to said slide, gearing connected to said rack, and a second rack connected to said gearing and carriage and responsive to the motion of said carriage for operating said gearing to move said second rack and said slide relatively to said bed and said carriage, one of said racks being adjustably movable to oppositely engage said gearing whereby to reverse the direction of motion of said slide relatively to said bed.

10. In a machine tool, a bed, a work-piece rotating element, a carriage, mechanism for moving said carriage relatively to said bed, a tool associated with said carriage, an angularly disposable guide, a stationary rack connected to said bed, a second rack operatively connected to said guide, a stationary support mounted on said bed and positionally adjustable relatively thereto a shaft rotatably mounted in said carriage, and mechanism including gearing on said shaft operatively interconnecting said racks and mounted on said stationary support, said gearing being arranged to move said guide relatively to said carriage in response to the motion of said carriage along said bed.

11. In a machine tool, a bed, a work-piece rotating element, a carriage, mechanism for moving said carriage relatively to said bed, a tool associated with said carriage, an angularly disposable guide, a stationary rack connected to said bed, a second rack operatively connected to said guide, a stationary support mounted on said bed and positionally adjustable relatively thereto pinions mounted on said stationary support and engaging both of said racks, and interchangeable pick-off gears also mounted on said stationary support and operatively interconnecting said pinions and arranged to move said guide relatively to said carriage along said bed in response to the motion of said carriage.

CLIFFORD A. BICKEL.